United States Patent [19]

Yoon et al.

[11] 4,408,572
[45] Oct. 11, 1983

[54] ETHER COLD STARTER IN ALCOHOL FUEL TREATMENT AND DISTRIBUTION APPARATUS AND METHOD

[75] Inventors: Heeyoung Yoon, McMurray, Pa.; Robert G. Jackson, Weston, Conn.

[73] Assignee: Conoco Inc., Wilmington, Del.

[21] Appl. No.: 389,131

[22] Filed: Jun. 16, 1982

Related U.S. Application Data

[63] Continuation-in-part of Ser. No. 286,992, Jul. 27, 1981, Pat. No. 4,366,782.

[51] Int. Cl.³ .................. F02B 43/00; F02M 27/02
[52] U.S. Cl. .................. 123/3; 123/180 AC; 123/576
[58] Field of Search ....... 123/1 A, 3, 180 R, 180 AC, 123/587, 576; 48/197 R

[56] References Cited

U.S. PATENT DOCUMENTS

| | | | |
|---|---|---|---|
| 3,828,736 | 8/1974 | Koch | 123/1 A |
| 4,021,370 | 5/1977 | Harris et al. | 48/197 R |
| 4,028,067 | 6/1977 | Gent | 48/197 R |
| 4,046,522 | 9/1977 | Chen et al. | 123/3 |
| 4,086,877 | 5/1978 | Henkel et al. | 123/3 |
| 4,088,450 | 5/1978 | Kosaka et al. | 123/3 |
| 4,091,086 | 5/1978 | Hindin et al. | 423/648 R |
| 4,282,835 | 8/1981 | Peterson et al. | 123/3 |

OTHER PUBLICATIONS

Kikuchi et al., J. Japan Petrol. Inst., 23, (5), 328–333 (1980).

*Primary Examiner*—William A. Cuchlinski, Jr.
*Attorney, Agent, or Firm*—Dale Lovercheck; William A. Mikesell, Jr.

[57] ABSTRACT

In a system including an alcohol fuel container, a first catalyst containing reactor, an internal combustion engine, alcohol is passed from the container through the first reactor which contains dissociation catalyst. The alcohol is dissociated in the first reactor to form a combustible gaseous mixture comprising hydrogen. The hydrogen is then fed to the engine. The improvement includes passing alcohol through a second reactor containing dehydration catalyst to form ether. Then passing that ether to the engine for start-up. Thus, the engine may be started using a mixture of ether formed in the second reactor and alcohol and then operated using hydrogen formed in the first reactor.

9 Claims, 1 Drawing Figure

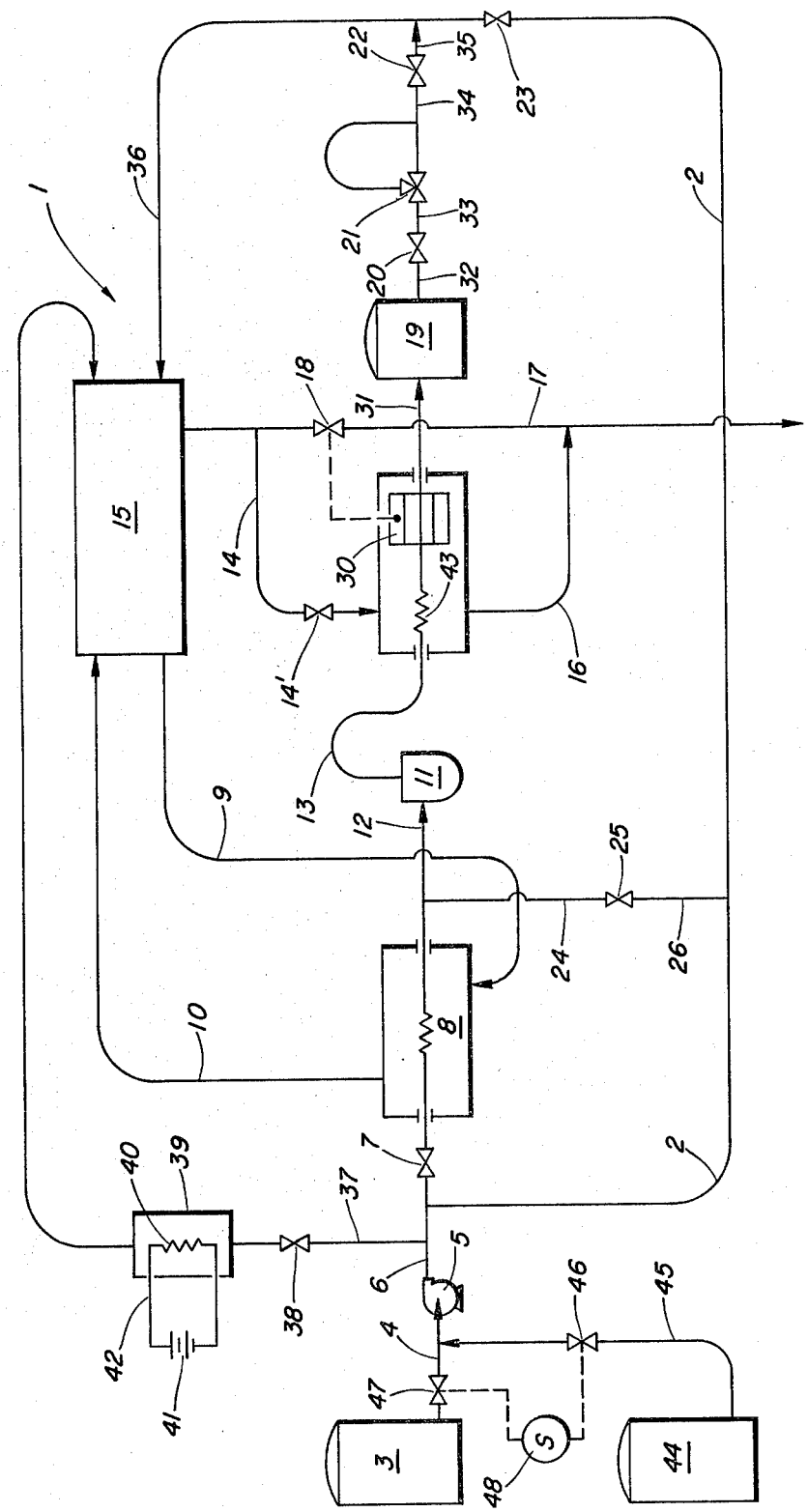

ETHER COLD STARTER IN ALCOHOL FUEL TREATMENT AND DISTRIBUTION APPARATUS AND METHOD

BACKGROUND OF THE INVENTION

This is a continuation-in-part of U.S. patent application Ser. No. 286,992 filed July 27, 1981 now U.S. Pat. No. 4,366,782 issued Jan. 4, 1983.

Kosaka et al, discloses in U.S. Pat. No. 4,088,450 a plurality of catalysts arranged in a desirable order based on the temperature gradient existing in the reaction chamber. The operating temperature of the catalyst and the temperature of the portion of the reaction chamber it is in, are matched so as to avoid catalytic degradation and/or catalytic inactivity.

Hinden et al in U.S. Pat. No. 4,091,086 discloses a catalytic composition particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

Henkel et al in U.S. Pat. No. 4,086,877 discloses a fuel gas obtained in a reformed gas generator through the catalytic reaction of hydrocarbons and a gas containing oxygen and provided to an internal combustion engine has its heat content along with that of the exhaust gas of the engine used to convert methanol endothermically into a gas mixture containing carbon monoxide and hydrogen with the gas mixture so formed fed to one or both the reformed gas generator and, along with the fuel gas, the internal combustion engine.

Peterson et al in U.S. Pat. No. 4,282,835 provides for synthesizing CO and $H_2$ fuel from CO and water in a second synthesizer. The methanol is confined in a fuel tank as a liquid. The water is confined in a water tank. A fuel pump and a water pump pump fuel and water to a mixing valve. A heat exchanger heats the fuel and water to a gas which passed through $Ni/Al_2O_3$ catalyst at 500° C. where the $CH_3OH$ disassociates to CO and $H_2$. The gas passes to a second synthesizer containing $Fe/Al_2O_3$ above 500° C. where $H_2O$ and CO form $H_2$ and $CO_2$ the gas is mixed with air and passed to an engine.

Chen et al in U.S. Pat. No. 4,046,522 provides a pre-engine converter. The catalyst in the first reactor may be copper zinc chromite. Col. 2, lines 28-35. A second catalyst is a hydrocarbon cracking catalyst such as zeolite.

Kikuchi et al in J. Japan Petrol. Inst., 23, (5), 328-333 (1980) discloses exothermic partial combustion during start-up of a methanol fueled engine. At Table I on page 329 he lists copper/zinc catalyst as well as copper/-nickel catalyst for conversion of methanol on various supported copper catalyst. At page 332 Kikuchi discusses methanol conversion to give formaldehyde type intermediate which decomposes to hydrogen and carbon monoxide as shown in the first two equations listed therein.

SUMMARY OF THE INVENTION

In a fuel treatment and distribution process comprising providing an alcohol fuel storage means, a first catalyst containing reactor, an internal combustion engine, said first reactor containing a dissociation catalyst, passing alcohol from said storage means through said first reactor to form a combustible gaseous mixture comprising hydrogen, and passing said hydrogen to said engine wherein the improvement comprises providing a second catalyst containing reactor for start-up in fluid flow communication with said fuel storage means and said engine, said second reactor containing a dehydration catalyst, passing said alcohol through said second catalyst to form ether, and passing said ether to said engine, whereby said engine may be started using ether formed in said second reactor, and then operated using hydrogen formed in said first reactor.

A Method of starting and operating an internal combustion engine comprising the sequence of steps as follows:
 (a) providing liquid alcohol and vaporizing a portion of said liquid alcohol to form alcohol vapor,
 (b) dehydrating said alcohol vapor to form a start-up fuel mixture comprising ethers,
 (c) mixing said start-up fuel mixture with air to form a start-up combustion mixture,
 (d) igniting said start-up combustion mixture in said internal combustion engine to start the said engine,
 (e) conveying alcohol vapor to a dissociation catalytic reactor,
 (f) dissociating at least a portion of said alcohol vapor to form an operational fuel mixture comprising hydrogen,
 (g) mixing said operational fuel mixture with air to form an operational combustion mixture,
 (h) igniting said operational combustion mixture in said engine,
whereby said engine is cold-started on said start-up combustion mixture and the operation of said engine is sustained on said operational combustion mixture.

A fuel treatment and distribution apparatus for use with an internal combustion engine comprising,
 an alcohol fuel storage tank
 a source of electrical power,
 a vaporizer,
 a catalyst containing reactor, said catalyst containing reactor comprising an electric resistance heating element and a dehydration catalyst,
 a gas storage tank,
 and a by-pass conduit means,
 the alcohol storage tank being fluid flow communication with the vaporizer means,
 the alcohol storage tank being in fluid flow communication with the by-pass conduit means,
 the vaporizer being in fluid flow communication with the catalyst containing reactor means,
 the catalyst containing reactor means being in fluid flow communication with the gas storage tank,
 the gas storage tank being in fluid flow communication with internal combustion engine, and the by-pass conduit means being in fluid flow communication with the internal combustion engine.

BRIEF DISCUSSION OF THE DRAWING

The drawing is a schematic representation of an apparatus in accordance with the present invention.

DETAILED DISCUSSION OF THE INVENTION

The invention relates to a fuel treatment and distribution apparatus and method as shown in the drawing.

The present invention provides an improved coal starting method and apparatus. Alcohol fueled cars have difficulty at low temperatures for example where the ambient temperature is below 50° F. the vapor pressure of alcohol is low and causes difficulty during startup of an alcohol fueled engine. The method and apparatus of the present invention provide for the dehydration of methanol or other alcohol to form dimethyl ether or higher ethers. Dimethyl ether, for example, is a gaseous fuel at room temperatures with a minus 23° C. boiling point. The car can be cold started with the mixture of ether and alcohol. After the car is started the reactor is blocked by control valves and all of the alcohol is fed to the engine either through an operational dissociation reactor which is larger and provided with a catalyst for the formation of hydrogen and carbon monoxide or alternatively the methanol is fed directly to the engine. A preferred dehydration catalyst for the dehydration of alcohol is alumina ($Al_2O_3$).

As shown in the drawing, a fuel system is generally shown at 1. The fuel system 1 has a catalyst containing reactor 30 and a by-pass conduit 2. Liquid alcohol is stored in the liquid alcohol storage tank 3. From liquid alcohol storage tank 3 the liquid alcohol is conveyed in liquid alcohol conduit 4 by pump 5 to vaporizer feed line 6 and by-pass conduit 2. Liquid alcohol passes from vaporizer feedline 6 through solenoid valve 7 and into the vaporizer 8. The vaporizer 8 is heated by engine coolant which enters vaporizer 8 through vaporizer heat transfer feedline 9. From the vaporizer the engine coolant returns to the engine through vaporizer heat transfer fluid output line 10. The vaporized alcohol is conveyed from the vaporizer 8 to the liquid trap 11 by line 12 and from the liquid trap 11 through line 13 to the catalyst containing reactor 30. The catalyst containing reactor 30 operates at about 600° F. The vaporized alcohol is dissociated into hydrogen and carbon monoxide is the catalyst containing reactor 30. A preferred catalyst for dissociation in the catalyst bed of the catalyst containing reactor 30 is a copper/zinc catalyst with or without promoters such as chromium. However, the dissociater may be provided with a dual catalyst bed; one catalyst being a low temperature dissociation catalyst and the other catalyst being a high temperature dissociation catalyst. Useful as a low temperature catalyst is a copper/zinc catalyst with or without promoters. Useful as a high temperature catalyst is a zinc/chromium catalyst. The advantage of having a dual catalyst bed is that the low temperature catalyst is protected from deactivation by thermal sintering because the dissociation reaction in the high temperature catalyst zone reduces the operating temperature of the low temperature catalyst bed. Thus, the vaporized alcohol first contacts the high temperature catalyst and then contacts the low temperature catalyst as it passes through the catalyst containing reactor 30.

The dissociation catalyst bed may be low temperature catalyst alone for example a copper/zinc catalyst as previously mentioned.

The catalyst containing reactor 30 and the superheater shown in the drawing are heated by exhaust from the internal combustion engine 15. Exhaust from the internal combustion engine 15 is conveyed by conduit 14 having solenoid valve 14' to the catalyst containing reactor 30. The engine exhaust leaves the catalyst containing reactor 30 through the conduit 16. This cooled engine exhaust may be recycled to the engine or exhausted to the atmosphere or partially recycled and partly exhausted to the atmosphere. The superheater 43 after line 13 and before reactor 30 heats the fuel which is heated to about 200° F. in a vaporizer 8 and superheated to about 600° F. in the superheater 43.

An exhaust flow valve 18 is provided with temperature control, to control the temperature of the catalyst containing reactor 30. Engine exhaust from the engine 15 may be by-passed around the catalyst containing reactor 30 through the exhaust flow valve 18 and into the exhaust flow conduit 17. By controlling the amount of exhaust used to heat the catalyst containing reactor 30 the temperature of the catalyst containing reactor may be regulated. The exhaust flow valve 18 is connected to a temperature sensor on the reactor 30.

Dissociated alcohol from the catalyst containing reactor 30 passes through conduit 31 into storage tank 19. Storage tank 19 provides gas for use during startup and surge conditions such as acceleration. From the storage tank 19 gas travels through conduit 32 to the solenoid valve 20. From the solenoid valve 20 gas travels through line 33 to the pressure control valve 21. From the pressure control valve 21 the dissociated alcohol travels through line 34 to the dissociated gas control mechanism 22. From the dissociated gas control mechanism 22, the gas travels through line 35 to fuel feed conduit 36 into engine 15. The dissociated gas control mechanism 22 and the fuel flow mechanism 23 may be that of an automobile fuel injection system or an automobile carburetor.

Undissociated alcohol from by-pass conduit 2 also passed into fuel feed conduit 36. By-pass conduit 2 is provided with fuel flow mechanism 23. Fuel flow mechanism 23 controls the amount of undissociated alcohol to be fed into the internal combustion engine 15 via fuel feed conduit 36.

The preferred alcohol for use in the fuel system is methanol. Among the advantages of the by-pass conduit system is that more fuel material may be passed into the internal combustion engine 15 during periods of peak operation, such as in the case where quantities of fuel in excess of those of normal operation are needed for example during startup and acceleration.

The line 24 connects evaporator 8 to valve 25. Line 26 connects valve 25 to line 2. Thus, evaporated methanol may be fed to line 2 to provide a mixed feed of vaporized methanol and liquid methanol to engine 15 via line 36.

Because of the capacity of the acceleration loop, the dissociation reactor need only be large enough to handle normal operation conditions. Periods of peak operation can be handled by the capacity of the acceleration loop.

The reactor 39 is required to convert only a small portion of alcohol feed required for engine cold start. Liquid alcohol delivered through line 2 is combined with gaseous fuel from reactor 39 for engine cold start. Preferably the liquid alcohol is atomized. Since only a small portion of alcohol feed is converted, the reactor can be physically smaller and contains less catalyst than needed to convert all of the start-up fuel to ethers.

During start-up the valves 7, 14' and 20 are in a closed position so that the liquid fuel from tank 3 is fed through line 37 through valve 38 into combined vaporizer catalytic reactor 39 which has heating element 40. The battery 41 passes current through line 42 and electrical resistance heating element 40. The dehydration catalyst such as $Al_2O_3$ in the reactor 39 forms the alcohol feed into ethers which are fed to the engine for start-up.

In another embodiment of the invention, the tank 3 may contain gasoline or alternatively, the tank 3 may contain an alcohol fuel and an additional tank contains an alternative fuel such as gasoline, this additional tank is in fluid flow communication with line 2 for example by being connected to line 4. When operating on gasoline the valves 7, 14' and 20 are closed and the gasoline is fed through the line 2 through the fuel flow mechanism 23 to the engine 15.

In start-up using methanol, for example, as the alcohol fuel, the valves 7, 14' and 20 are closed to that methanol is fed through the line 37 directly through reactor 39 and then into the engine. In start-up liquid alcohol is also fed to the engine via line 2. When the engine is turned off the valves 7, 14', 20 and 38 are closed. In closing these valves dissociated gas is trapped in the storage tank 19. This stored hydrogen optionally is forced from tank 19 through open valves 20 into engine 15 to supplement the ether formed in reactor 39.

In an embodiment of the invention using more than one fuel tank, a selector switch 48 which provides for the selection of which fuel is to be used is provided by control of the feed valves from the storage tank for each fuel. In this embodiment of the invention, the valve 47 is in line 4 between the pump 5 and the storage tank 3. Additionally, the additional storage tank 44 is connected to the line 4 by line 45. The valve 46 is in the line 45 connecting the additional storage tank 44 to line 4. The valve 47 is in the line 4 between the storage tank 3 and the line 45 connecting line 4 with the additional storage tank 44. The selector switch 48 controls the valves 46 and 47 to proportion each fuel used or to select which fuel is used alone. The additional tank 44 preferably contains gasoline.

Where methanol is the fuel in storagee tank 3, the reaction $$CH_3OH \rightarrow CO + 2H_2 \quad (I)$$

takes place in reactor 30. In the engine 15, CO and $H_2$ from line 36 are mixed with $O_2$ for example in a carburetor with an air tintake opening, and combusted by reaction $$CO + H_2 + O_2 \rightarrow CO_2 + H_2O. \quad (II)$$

Where methanol is the fuel in the storage tanks 3 the reaction $$2 CH_3OH \rightarrow (CH_3)_2O + H_2O \quad (III)$$

takes place in the dehydration reactor 39. This reaction is somewhat exothermic the change in enthalpy at 298° K. being −2.35 KCal per g-mole of gaseous methanol. Thus, the battery has to supply electrical power sufficient only for vaporizing the methanol fed to the reactor 39.

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

What is claimed is:

1. A fuel treatment and distribution apparatus for use with an internal combustion engine comprising
   an alcohol fuel storage means,
   an electrical power source means,
   a vaporizer means,
   a catalyst containing start-up reactor means, said catalyst containing reactor comprising an electric resistance heating means connected to receive electrical power from said electrical power source means and a dehydration catalyst,
   and a by-pass conduit means,
   said alcohol storage means being in fluid flow communication with said vaporizers means,
   said vaporizer means being in fluid flow communication with said dehydration catalyst containing start-up reactor means,
   said catalyst containing start-up reactor means being in fluid flow communication with said internal combustion engine,
   said alcohol storage means being in fluid flow communication with said internal combustion engine through said by-pass conduit means circumventing said start-up reactor means.

2. The apparatus of claim 1 further comprising a catalyst containing operational reactor means, said operational reactor means comprising a dissociation catalyst, said operational reactor means being a fluid flow communication with said alcohol fuel storage means and said engine.

3. The apparatus of claim 2 wherein said operational reactor means further comprises waste heat recovery heat exchange means.

4. In a fuel treatment and distribution process comprising providing an alcohol fuel storage means, a first catalyst containing reactor, an internal combustion engine, said first reactor containing a dissociation catalyst, passing alcohol from said storage means through said first reactor to form a combustible gaseous mixture comprising hydrogen, and passing said hydrogen to said engine wherein the improvement comprises providing a second catalyst containing reactor for start-up in fluid flow communication with said fuel storage means and said engine, said second reactor containing a dehydration catalyst, passing said alcohol through said second catalyst to form ether, and passing said ether along with said alcohol delivered through said by-pass conduit means to said engine, whereby said engine may be started using ether formed in said second reactor and said alcohol, and then operated using hydrogen formed in said first reactor.

5. The process of claim 4 wherein said alcohol is methanol.

6. A method of starting and operating an internal combustion engine comprising the sequence of steps as follows:
   (a) providing liquid alcohol and vaporizing a portion of said liquid alcohol to form alcohol vapor,
   (b) dehydrating said alcohol vapor to form a start-up fuel mixture comprising ethers,
   (c) mixing said start-up fuel mixture with air to form a start-up combustion mixture,
   (d) igniting said start-up combustion mixture in said internal combustion engine to start the said engine,
   (e) conveying alcohol vapor to a dissociation catalytic reactor,
   (f) dissociating at least a portion of said alcohol vapor to form an operational fuel mixture comprising hydrogen,
   (g) mixing said operational fuel mixture with air to form an operational combustion mixture,
   (h) igniting said operational combustion mixture in said engine, whereby said engine is cold-started on said start-up combustion mixture and the operation of said engine is sustained on said operational combustion mixture.

7. The method of claim 6 wherein said start-up fuel mixture further comprises atomized liquid alcohol.

8. The method of claim 6 wherein said alcohol is methanol.

9. The method of claim 7 wherein said alcohol is methanol.

* * * * *